United States Patent [19]
Trumbull

[11] Patent Number: 5,629,028
[45] Date of Patent: May 13, 1997

[54] UNDERWATER PELLETIZER HAVING SEALED HEAT TRANSFER TUBES EMBEDDED IN EXTRUSION DIE

[75] Inventor: Walter Trumbull, Midland, Mich.

[73] Assignee: The Conair Group, Inc., Pittsburgh, Pa.

[21] Appl. No.: 551,863

[22] Filed: Nov. 7, 1995

[51] Int. Cl.[6] .................... B29B 9/00; B29C 47/12
[52] U.S. Cl. .................... 425/67; 264/142; 425/313; 425/464
[58] Field of Search .................... 425/67, 313, 311, 425/464; 264/142

[56] References Cited

U.S. PATENT DOCUMENTS

| | | | |
|---|---|---|---|
| 3,114,169 | 12/1963 | Palmer et al. | 425/67 |
| 3,341,892 | 9/1967 | Mayner | 425/313 |
| 3,516,120 | 6/1970 | Braun et al. | 425/311 |
| 3,618,162 | 11/1971 | Scharer et al. | 425/311 |
| 4,123,207 | 10/1978 | Dudley | 425/67 |
| 4,150,595 | 4/1979 | Loffler et al. | 425/313 |
| 4,251,198 | 2/1981 | Altenburg | 425/313 |
| 4,327,050 | 4/1982 | Salmon | 425/311 |
| 4,373,132 | 2/1983 | Vartanian | 425/549 |
| 4,389,002 | 6/1983 | Devellian et al. | 425/549 |
| 4,500,271 | 2/1985 | Smith | 425/67 |
| 4,621,996 | 11/1986 | Hundley, III | 425/67 |
| 4,728,276 | 3/1988 | Pauley et al. | 425/311 |
| 4,846,644 | 7/1989 | Lin | 425/313 |
| 5,059,103 | 10/1991 | Bruckmann et al. | 425/67 |
| 5,143,673 | 9/1992 | Grimminger | 425/67 |
| 5,403,176 | 4/1995 | Bruckmann et al. | 425/313 |

FOREIGN PATENT DOCUMENTS 856824  8/1981  U.S.S.R. .................... 264/142

Primary Examiner—Robert Davis
Attorney, Agent, or Firm—Buchanan Ingersoll, P.C.

[57] ABSTRACT

An improved underwater pelletizer is provided. The improved pelletizer has sealed heat transfer tubes embedded within the extruder die to utilize the heat of the molten polymer entering the extruder die by efficiently transferring that heat to the die plate and die face of the pelletizer. Ceramic inserts and/or inserts of other insulating materials are provided adjacent the die plate to insulate the passages through which the molten polymer passes and to inhibit cooling of the polymer within the extruder die as it approaches the die plate. The insulating inserts are positioned behind, and abut, the die plate around the passages that deliver the molten polymer to the die plate. Water makeup is provided at the cutter blades of the pelletizer to prevent cavitation within the water housing so that pellets will not agglomerate within the water housing.

22 Claims, 6 Drawing Sheets

UNDERWATER PELLETIZER HAVING SEALED HEAT TRANSFER TUBES EMBEDDED IN EXTRUSION DIE

BACKGROUND OF THE INVENTION

1. Field of the Invention

The present invention relates generally to an improved underwater pelletizer in which a molten polymer is extruded through die orifices in a die plate in the form of continuous strands that are cut into pellets by a rotating knife holder with knives that engage the die plate. The die plate and the knife assembly are housed within a water housing so that the pelletizing takes place under water. The improved pelletizer provides a series of heat transfer tubes to transfer heat from the inlet of a transition piece where the molten polymer enters the extruder die so that heat is transferred more efficiently from the extruder forwardly to the die face and the die plate to thereby facilitate extrusion of the polymer through the die orifices. The novel use of heat transfer tubes in this setting provides for an efficient use of the heat of the molten polymer.

It is useful to have the molten polymer leaving the die orifices as warm as possible to provide uniform viscosity of molten polymer at the orifice to provide uniform strands and, in turn, uniform pellets. The warmer the polymer, the less chance there is of having die "freeze offs" when the water contacts the polymer.

The improved pelletizer of the present invention also has ceramic inserts and/or inserts of other insulating materials that surround the passages that feed the molten polymer to the die plate in which the orifices are formed. These ceramic inserts and/or inserts of other insulating materials insulate the passages near the die plate to inhibit cooling of the molten polymer as it is forced through the die plate.

The improved underwater pelletizer of the present invention also provides for water to be conducted to the cutter through a hollow shaft that supports the cutter and turns it so that the cutting blades abut the die orifice. Water from the hollow shaft is expelled from the cutter blade holder in advance of each cutter blade through water nozzles formed in the cutter blade holder. This arrangement prevents cavitation of the water in front of the cutter blades as the cutter blade holder turns to cut the extruded polymer.

All of these features are particularly useful in an underwater pelletizer designed to make very small pellets. The orifices through which the molten polymer is extruded are generally of a size of from 0.020–0.050 inches in diameter so that if cavitation occurs within the water housing of the underwater pelletizer, the very small pellets will agglomerate rather than being transported by the water out of the water housing as separate integral pellets.

2. Description of the Prior Art

Underwater pelletizers are well known and have been in use for many years. Certain advantages are gained by pelletizing molten polymer under water just as it leaves the die orifice. By cutting the polymer as it leaves the die orifice, uniform pellets are formed and the polymer is hardened within the water housing of the underwater pelletizer. The following United States patents are directed to various features of underwater pelletizers:

U.S. Pat No. 4,123,207 issued Oct. 31, 1978
U.S. Pat No. 4,251,198 issued Feb. 17, 1981
U.S. Pat No. 4,500,271 issued Feb. 19, 1985
U.S. Pat No. 4,621,996 issued Nov. 11, 1986
U.S. Pat No. 4,728,276 issued Mar. 1, 1988
U.S. Pat No. 5,059,103 issued Oct. 22, 1991
U.S. Pat No. 5,403,176 issued Apr. 4, 1995

Although many features of underwater pelletizers are shown in the foregoing patents, none of these patents disclose the novel features of the present invention.

SUMMARY OF THE INVENTION

In accordance with the present invention there is provided an underwater pelletizer with a die face having a plurality of die orifices extending therethrough and through which continuous strands of molten polymer are extruded. A cutter blade assembly abutting the die face includes blades for cutting the strands of molten polymer into pellets and a water housing encloses the die face and the cutter blade assembly to entrain the pellets in a flow of water. The underwater pelletizer is improved by providing a transition piece for receiving molten polymer at one end and for supporting a die plate at the die face at its other end. The transition piece has longitudinal passages through it to permit movement of molten polymer to the die plate. A plurality of heat transfer tubes is secured longitudinally within the transition piece. The heat transfer tubes are each formed as an enclosed body with heat transfer fluid entrapped within the enclosed body so that heat is transferred efficiently from one end of the heat transfer tube to the other end whereby heat from the molten plastic entering the transition piece aids in heating the die plate at the die face on the other end of the transition piece. A plurality of annular ceramic inserts and/or inserts of other insulating materials is fixed within the transition piece and the ceramic inserts and/or inserts of other insulating materials form the ends of the longitudinal passages closest to the die face whereby the ceramic inserts and/or inserts of other insulating materials inhibit cooling of the molten plastic as it progress through the transition piece. The cutter blade assembly has a hollow shaft through which water is introduced to a cutter blade holder holding the cutter blades against the die plate. Water exit nozzles are formed in the cutter blade holder ahead of each cutter blade whereby water from the hollow shaft is directed into the water housing ahead of each cutter blade to prevent cavitation of the water in the water housing as the cutter blade holder turns.

Accordingly, it is an object of the present invention to provide an improved underwater pelletizer which is uniquely suited to forming very small size polymer pellets.

Another object of the present invention is to provide an improved underwater pelletizer in which heat is efficiently transferred to the die plate at the die face to facilitate extrusion of the polymer through very small holes.

Another object of the present invention is to provide water makeup in the vicinity of the knife blades to prevent cavitation of the water in the water housing to thereby prevent agglomeration of small pellets within the water housing.

DESCRIPTION OF THE PREFERRED EMBODIMENTS

Figure 1:
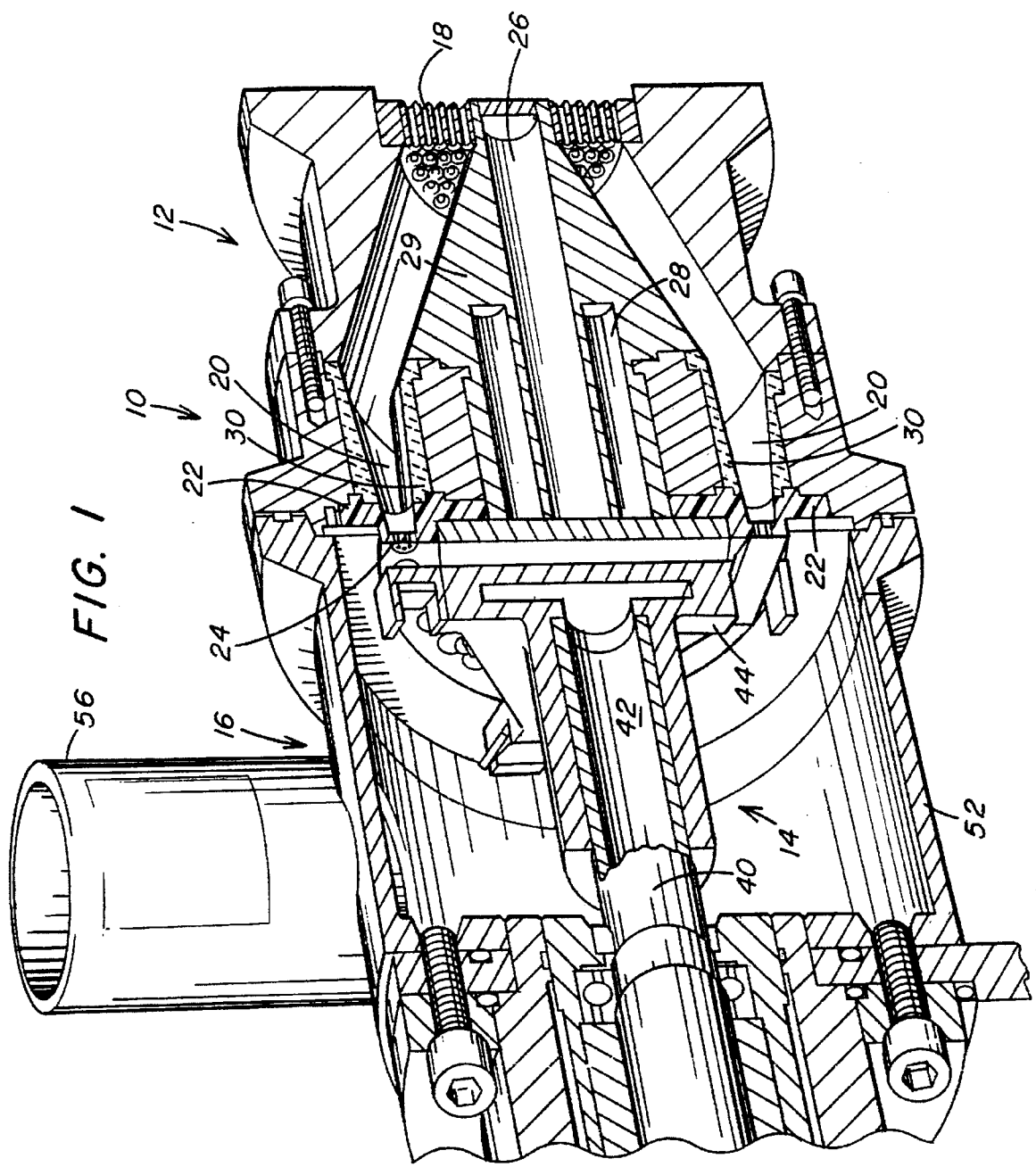
FIG. 1 is a perspective sectional view of the underwater pelletizer of the present invention.
Figure 2:
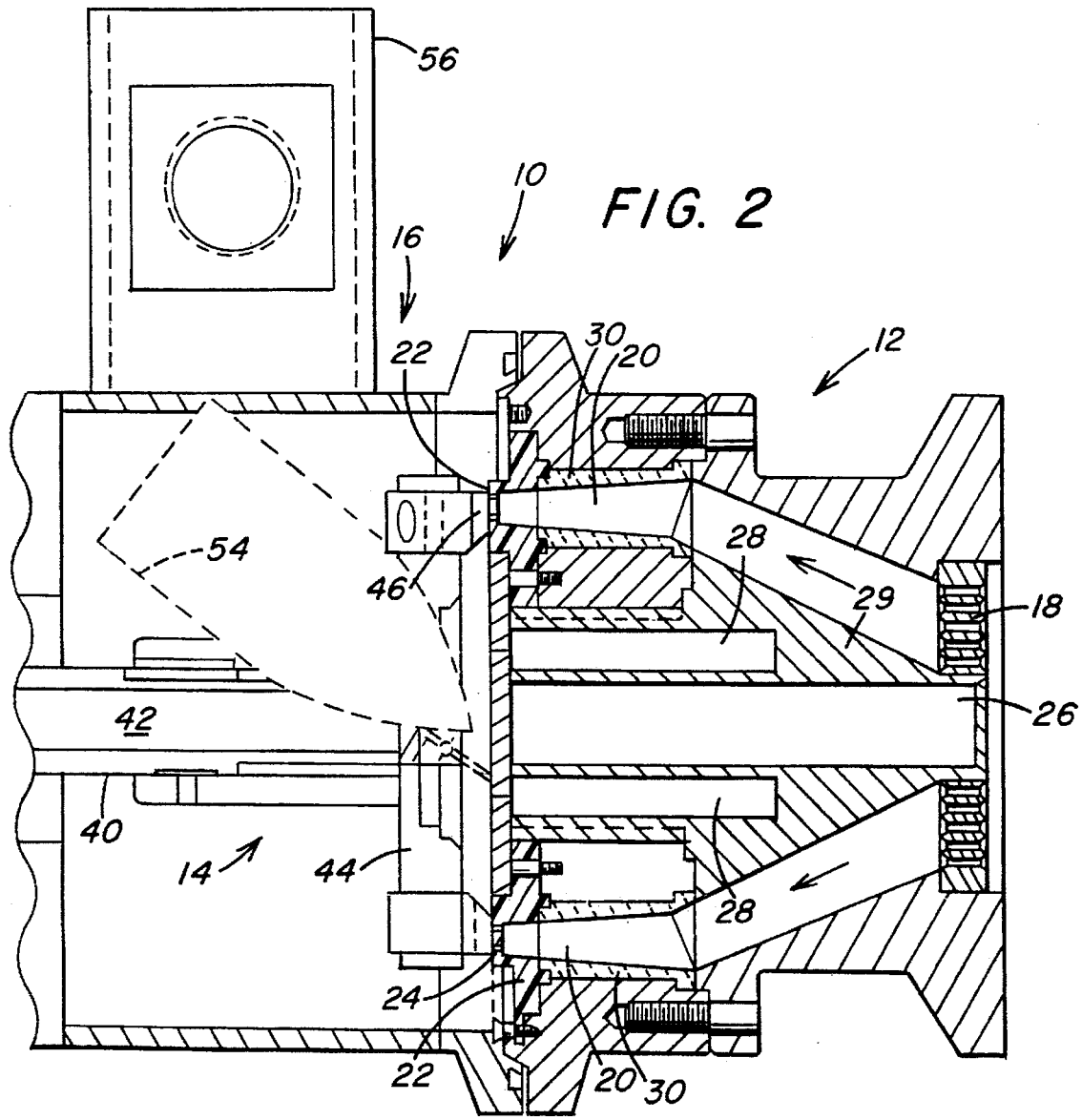
FIG. 2 is a sectional view of the underwater pelletizer of the present invention.

Referring to the drawings, and particularly to FIGS. 1 and 2 there is shown an underwater pelletizer indicated generally at 10. An extruder die 12 receives molten extrudate that is forced through orifices in the extruder die where the molten strands of polymer are cut by a cutter assembly indicated generally at 14. The cutter assembly is housed within a water housing indicated generally at 16.

At the entry end of the extruder die 12, a breaker plate 18 allows the molten polymer to pass into the extruder die 12. A plurality of passages 20 conduct the molten extrudate to the die face where a hardened steel die face plate 22 is fixed to the die face. The hardened steel face plate 22 is shown in greater detail in FIG. 5. The hardened steel face plate 22 has a plurality of small holes 24 formed at the end of each passage 20 (FIG. 1) that feeds molten extrudate to the die face plate 22.

Figure 4:
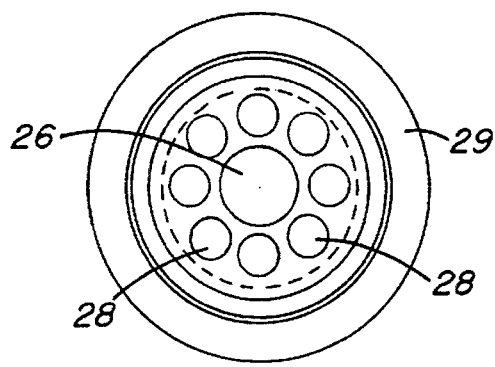
FIG. 4 is an end view taken along lines IV—IV of FIG. 3.
Figure 3:
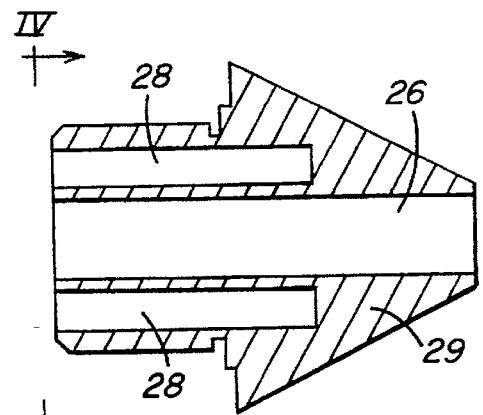
FIG. 3 is a sectional view of the transition piece core of the die of the present invention.

The present invention is being described for use in pelletizing very small size pellets. The holes 24 in the die face plate 22 are 0.020 to 0.050 inches in diameter so that the molten polymer strands are very fine. While the present invention can be utilized to form thicker strands of polymer and is useful for that purpose, it is particularly suited for forming very fine polymer strands that are pelletized under water. Within the transition piece core 29 (FIGS. 2, 3, and 4) a large heat tube 26 and eight smaller heat tubes 28 are positioned as shown in FIGS. 3 and 4. The large heat tube 26 extends the entire length of extruder die 12 while the smaller heat tubes 28 are parallel axially to the large heat tube 26 and surround it as best seen in FIG. 4.

The heat tubes of the present invention are sealed stainless steel tubes that contain a thermal transfer fluid. The tubes are permanently sealed and they serve to efficiently transfer heat from the inlet end of extruder die 12 to the die face plate 22 where the molten extrudate leaves through the small hole orifices 24 in the die face plate 22. The heat tubes 26 and 28 are manufactured by Noren Products, Inc. of 1010 O'Brien Drive, Menlo Park, Calif. 94025-1409.

In order to properly form the strands leaving the orifices 24 within the die face plate 22, it is desirable that the molten strands leave at the highest possible temperature when they enter the water housing 16 to be cut by the cutter assembly 14. The transfer of heat from the entering molten polymer to the die face plate 22 is greatly facilitated by the heat tubes 26 and 28.

To further prevent cooling of the molten polymer as it passes through the die 12, a plurality of annular ceramic inserts and/or inserts of other insulating materials 30 are positioned around the passages 20 within the extruder die 12 to insulate the passages 20 and prevent unwanted cooling of the molten polymer extrudate.

The cutter assembly 14 which is housed within the water housing 16 includes a hollow shaft 40 which has a water passage 42 formed longitudinally through the center of the shaft 40. A blade holder 44 (FIG. 6) has blades 46 secured to spokes 48 that extend from the blade holder 44. A plurality of water nozzles 50 extend between each of the spokes 48. Water is fed through the water passage 42 in shaft 44 into the blade holder 44 from which it is ejected through the nozzles 50. The nozzles 50 help to insure that there is water around the blades at all times as they rotate to cut the polymer extrudate as it leaves the die face plate 22.

Figure 6:
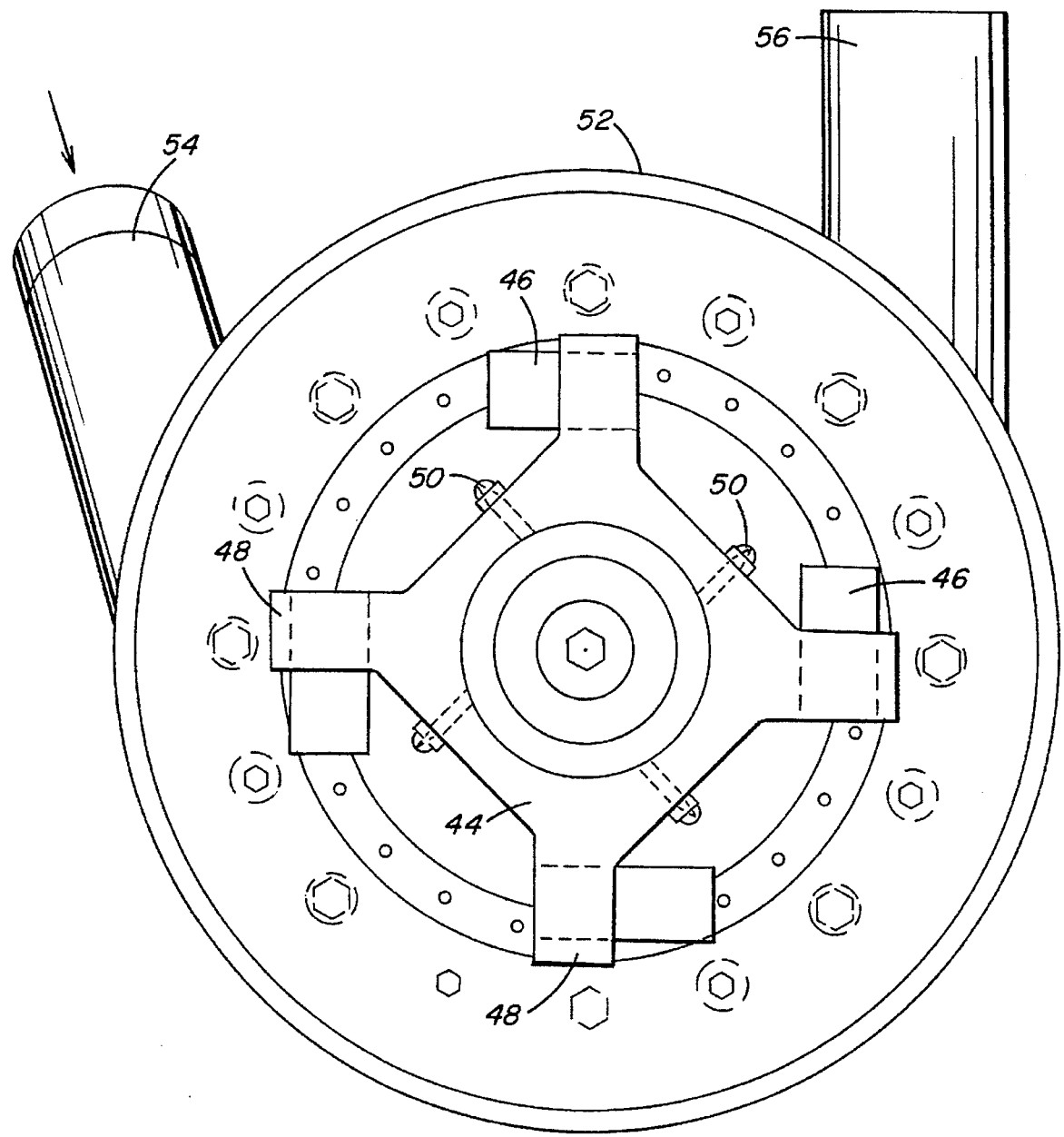
FIG. 6 is an end view of the cutter assembly of the present invention showing the position of the inlet and outlet ports to the housing.

As is the case with underwater pelletizers, the blades 46 bear against the die face plate 22 and cut the strands of molten polymer as they leave the die face plate 22 and enter the water bath within the water housing body 52. As best seen in FIGS. 2 and 6, the water within housing body 52 enters through water inlet 54 that is positioned at approximately a 45° angle to the horizontal and enters the housing at the level of the cutter shaft 40. The water outlet 56 from housing body 52 is vertical as shown in FIGS. 2 and 6. By having water enter a housing body 52 through the inlet 54 as positioned, the water circulates through the housing body 52 and entrains the pellets that are cut as they leave the die face plate 22. The water and entrained pellets leave through outlet 56. By having the water circulate around the housing from inlet 54 to outlet 56, cavitation within the water is eliminated when the arrangement of inlet 54 and outlet 56 is combined with the water nozzles 50 that emit water that enters through the water passage 42 in shaft 40.

Figure 5:
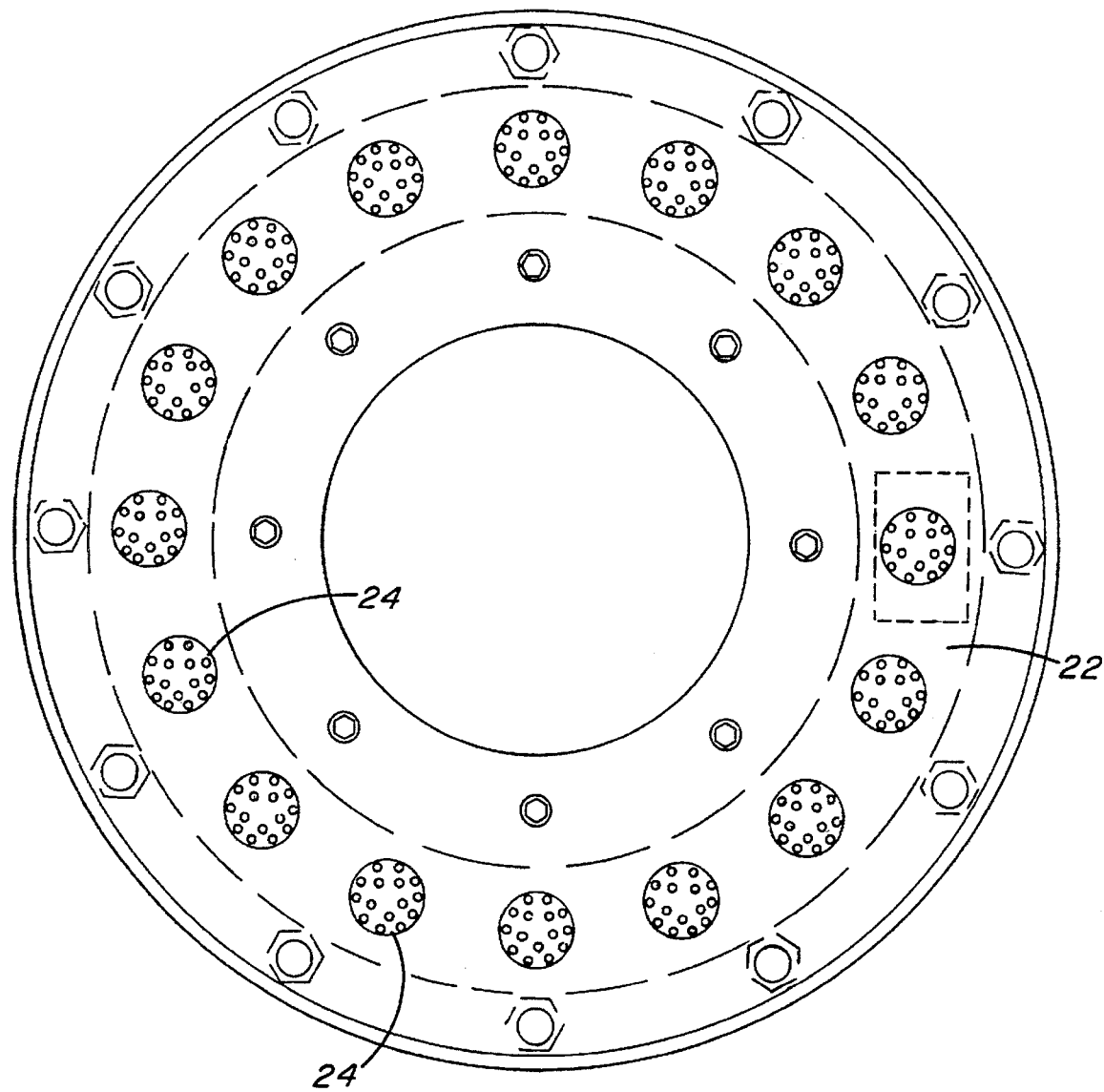
FIG. 5 is a detail view of the die plate of the present invention.
Figure 7:
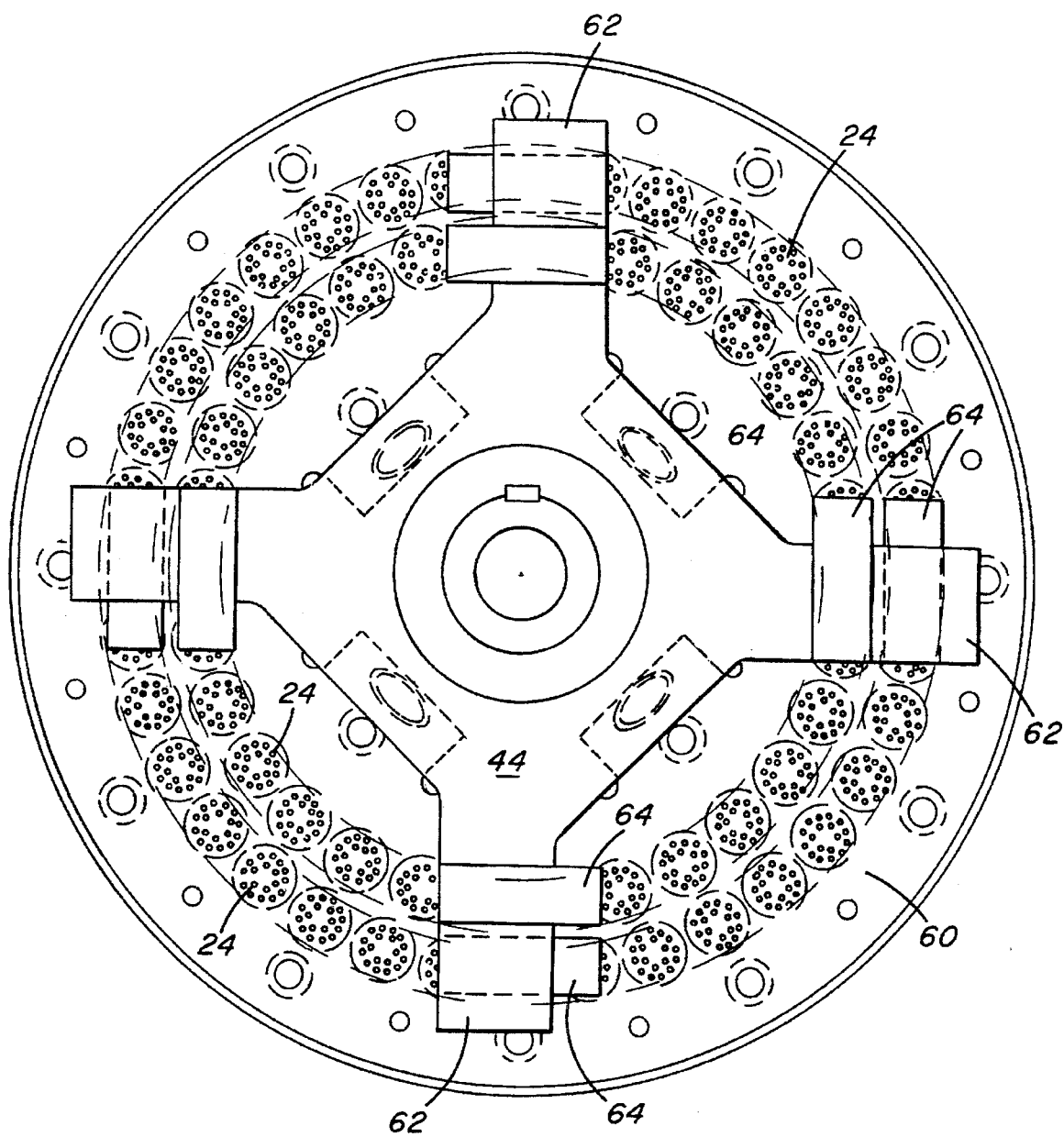
FIG. 7 shows a modified die plate having two concentric rows of die orifices with two cutter blades on each spoke of the cutter assembly.

FIG. 7 shows an alternative die face plate 60 which has a double concentric row of small orifices 24 formed in a fashion similar to the die face plate 22 shown in FIG. 5. The die face plate 60 of FIG. 7 is also formed of hardened steel and may be substituted into the structure shown in FIGS. 1 and 2. When die face plate 60 with the double row of orifices 24 is utilized, the blade holder 44 has elongated spokes 62 that each carry two blades 64. The two blades on each spoke 62 register with the double row of small orifices 24 so that they cut all of the strands being emitted from the die 12 when the die face plate 60 is utilized.

Figure 8:
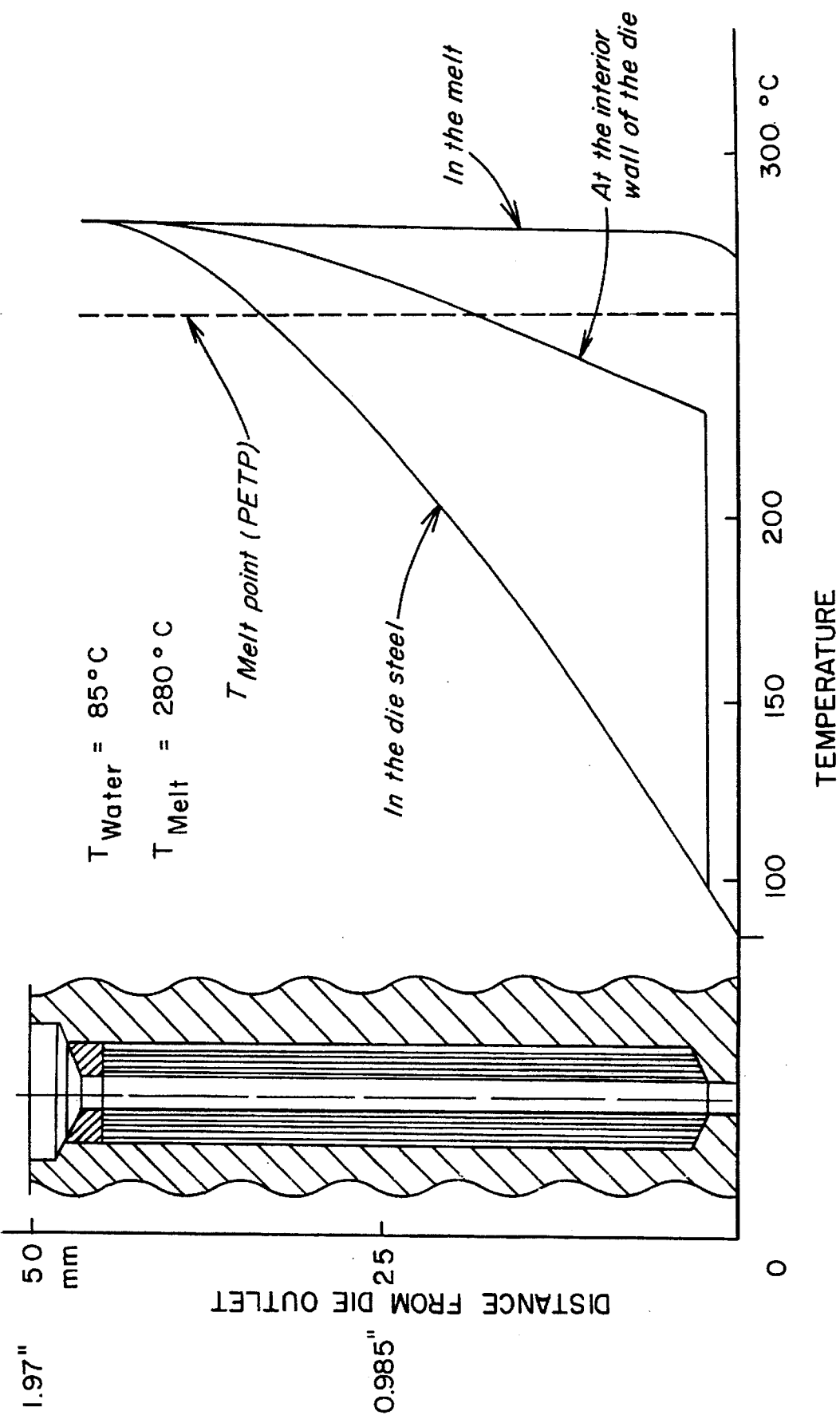
FIG. 8 is a graphic illustration of the thermal effect of water on an underwater pelletizer.

FIG. 8 graphically shows test results of the thermal effect of water on an underwater pelletizer. As may be seen from FIG. 8, as the distance from the die outlet is increased, which means that the distance to the die inlet is decreased, the temperature of the melted polymer, the interior wall of the die and the steel from which the die is formed are all at their maximum of approximately 280° C. As the molten polymer progresses toward the die face plate and the distance from the die outlet becomes smaller, the temperature of the die steel decreases most rapidly while, because of the ceramic inserts and/or inserts of other insulating materials and the heat tubes, the temperature at the interior wall of the die decreases less rapidly and the temperature of the melt hardly decreases at all until it reaches a point very close to the die outlet.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. In an underwater pelletizer with a die face having a plurality of die orifices extending therethrough through which continuous strands of molten polymer are extruded, a cutter blade assembly abutting the die face and including blades for cutting said strands of molten polymer into pellets and a water housing enclosing the said die face and said cutter blade assembly to entrain said pellets in a flow of water, the improvement comprising:

a transition piece for receiving molten polymer at one end and for supporting a die plate at said die face at its other end; said transition piece having longitudinal passages therethrough to permit movement of molten polymer to said die plate;

a plurality of heat transfer tubes secured longitudinally within said transition piece, said heat transfer tubes each formed as an enclosed body with heat transfer fluid entrapped within said enclosed body so that heat is transferred efficiently from one end of said heat transfer tube to the other end whereby heat from the molten plastic entering said transition piece aids in heating said die plate at said die face on the other end of said transition piece;

a plurality of annular insulating inserts fixed within said transition piece and forming the ends of said longitudinal passages closest to said die face whereby said insulating inserts inhibit cooling of said molten plastic as it progresses through said transition piece;

said cutter blade assembly having a hollow shaft through which water is introduced to a cutter blade holder holding said cutter blades against said die plate; and water exit nozzles formed in said cutter blade holder ahead of each cutter blade whereby water from said hollow shaft is directed into said water housing ahead of each cutter blade to prevent cavitation of the water in said water housing as said cuter blade holder turns.

2. The improvement of claim 1 wherein said transition piece longitudinal passages feed molten polymer through small holes in said die plate that are aligned with said longitudinal passages.

3. The improvement of claim 2 wherein a plurality of said small holes are aligned with each of said longitudinal passages.

4. The improvement of claim 1 wherein said die plate has two concentric rows of small holes formed at different radial distances on said die plate.

5. The improvement of claim 4 wherein said cuter blade assembly has double cutter blades at each blade position to cut the strands emerging from said two concentric rows of small holes formed in said die plate.

6. The improvement of claim 1 wherein at least one of said heat transfer tubes extends the full length of said transition piece.

7. The improvement of claim 1 wherein the axes of said heat transfer tubes are parallel to the axis of said transition piece and said heat transfer tubes are arranged radially around the axis of said transition piece.

8. The improvement of claim 1 wherein the ends of said insulating inserts abut said die plate.

9. The improvement of claim 1 wherein said cutter blade holder has a plurality of spokes extending radially from a center hub with said cutter blades being positioned at the ends of said spokes and said water exit nozzles being positioned between said spokes.

10. The improvement of claim 1 wherein said water housing has a water inlet conduit and a water outlet conduit; said water inlet conduit being positioned so that water enters the water housing at the level of the cutter blade assembly shaft and is directed downwardly toward the bottom of said water housing; said water outlet conduit being positioned at the top of said water housing so that water and pellets leave said water housing in a vertically upward direction; the water entering said water housing being circulated around said water housing and maintaining said water housing full of water until it exits at the top of said water housing.

11. In an underwater pelletizer with a die face having a plurality of die orifices extending therethrough through which continuous strands of molten polymer are extruded, a cutter blade assembly abutting the die face and including blades for cutting said strands of molten polymer into pellets and a water housing enclosing the said die face and said cutter blade assembly to entrain said pellets in a flow of water, the improvement comprising:

a transition piece for receiving molten polymer at one end and for supporting a die plate at said die face at its other end; said transition piece having longitudinal passages therethrough to permit movement of molten polymer to said die plate;

a plurality of heat transfer tubes secured longitudinally within said transition piece, said heat transfer tubes each formed as an enclosed body with heat transfer fluid entrapped within said enclosed body so that heat is transferred efficiently from one end of said heat transfer tube to the other end whereby heat from the molten plastic entering said transition piece aids in heating said die plate at said die face on the other end of said transition piece.

12. The improvement of claim 11 wherein said transition piece longitudinal passages feed molten polymer through small holes in said die plate that are aligned with said longitudinal passages.

13. The improvement of claim 12 wherein a plurality of said small holes are aligned with each of said longitudinal passages.

14. The improvement of claim 11 wherein said die plate has two concentric rows of small holes formed at different radial distances on said die plate.

15. The improvement of claim 11 wherein at least one of said heat transfer tubes extends the full length of said transition piece.

16. The improvement of claim 11 wherein the axes of said heat transfer tubes are parallel to the axis of said transition piece and said heat transfer tubes are arranged radially around the axis of said transition piece.

17. In an underwater pelletizer with a die face having a plurality of die orifices extending therethrough through which continuous strands of molten polymer are extruded, a cutter blade assembly abutting the die face and including blades for cutting said strands of molten polymer into pellets and a water housing enclosing the said die face and said cutter blade assembly to entrain said pellets in a flow of water, the improvement comprising:

a transition piece for receiving molten polymer at one end and for supporting a die plate at said die face at its other end; said transition piece having longitudinal passages therethrough to permit movement of molten polymer to said die plate;

a water housing water inlet positioned at about a 45° angle to the horizontal and admitting water in a downwardly direction at the center of said housing;

a water housing water outlet positioned vertically to remove water and pellets exiting said water housing whereby water circulates around the bottom of said water housing from said water inlet to said water outlet;

said cutter blade assembly having a hollow shaft through which water is introduced to a cutter blade holder holding said cutter blades against said die plate; and water exit nozzles communicating with radial passages formed in said cutter blade holder ahead of each cutter blade whereby water from said hollow shaft is directed through said radial passages and said water exit nozzles into said water housing ahead of each cutter blade to prevent cavitation of the water in said water housing as said cutter blade holder turns.

18. The improvement of claim 17 wherein said cutter blade holder has a plurality of spokes extending radially from a center hub with said cutter blades being positioned at the ends of said spokes and said water exit nozzles being positioned between said spokes.

19. The improvement of claim 17 wherein said die plate is formed of hardened steel.

20. In an underwater pelletizer with a die face having a plurality of die orifices extending therethrough through which continuous strands of molten polymer are extruded, a cutter blade assembly abutting the die face and including blades for cutting said strands of molten polymer into pellets and a water housing enclosing the said die face and said cutter blade assembly to entrain said pellets in a flow of water, the improvement comprising:

a transition piece for receiving molten polymer at one end and for supporting a die plate at said die face at its other end; said transition piece having longitudinal passages therethrough to permit movement of molten polymer to said die plate;

a plurality of annular insulating inserts fixed within said transition piece but not extended into said die plate and forming the ends of said longitudinal passages closest to said die face whereby said insulating inserts inhibit cooling of said molten plastic as it progresses through said transition piece.

21. The improvement of claim 20 wherein the ends of said insulating inserts abut said die plate.

22. The improvement of claim 21 wherein said die plate is formed from hardened steel.

* * * * *